Dec. 1, 1931.   W. C. MILLS ET AL   1,834,469
WINDSHIELD
Filed March 7, 1928    2 Sheets-Sheet 1

Dec. 1, 1931.  W. C. MILLS ET AL  1,834,469
WINDSHIELD
Filed March 7, 1928  2 Sheets-Sheet 2

Inventors.
William C. Mills.
Archie C. Frist.
by Hazard and Miller
Attorneys.

Patented Dec. 1, 1931

1,834,469

UNITED STATES PATENT OFFICE

WILLIAM C. MILLS AND ARCHIE C. FRIST, OF LONG BEACH, CALIFORNIA

WINDSHIELD

Application filed March 7, 1928. Serial No. 259,780.

This invention relates to vehicle bodies, and more especially to an improved type of windshield.

An object of the invention is the provision of a windshield capable of adjustment to either a vertical position or a position of angularity with the vertical.

Another object is the provision of a windshield adjustable as described, having incorporated therewith, means for establishing a weather-proof shield between the windshield and windshield frame, irrespective of the position to which the windshield has been adjusted.

Another object is the provision of a windshield and sealing means as described, in which the sealing means have the form of a shadow box capable of absorbing a certain amount of light which might otherwise tend to blind the driver of the vehicle.

With the foregoing and other objects in view which will be made manifest in the following detailed description and specifically pointed out in the appended claims, reference is had to the accompanying drawings for an illustrative embodiment of the invention, wherein:

Figure 1:
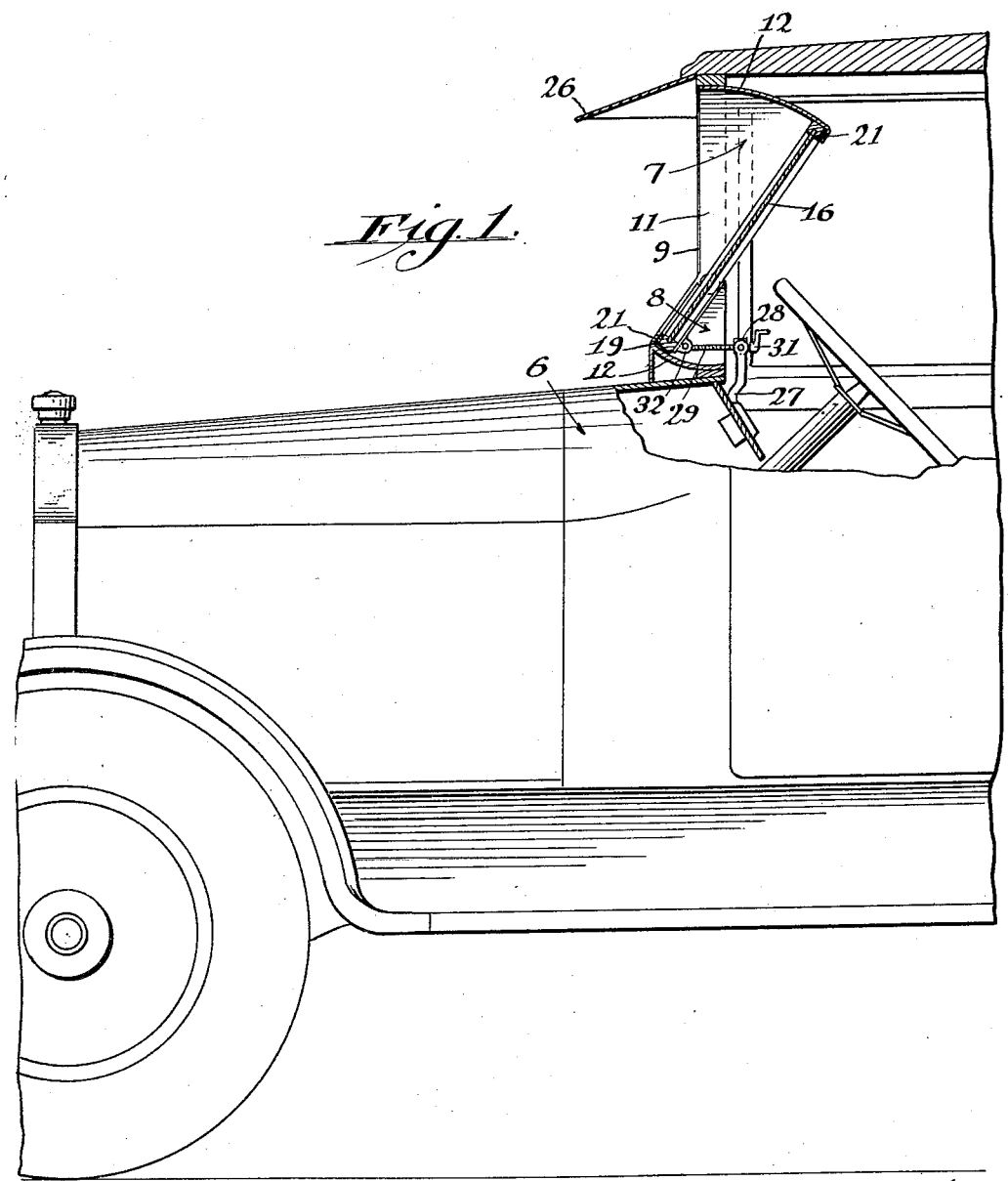
Figure 1 is a side elevation of an automobile to which our improved windshield has been applied. Our windshield and portion of the vehicle are shown in vertical section, and portions of the vehicle are broken away to reduce the length of the vehicle.
Figure 2:
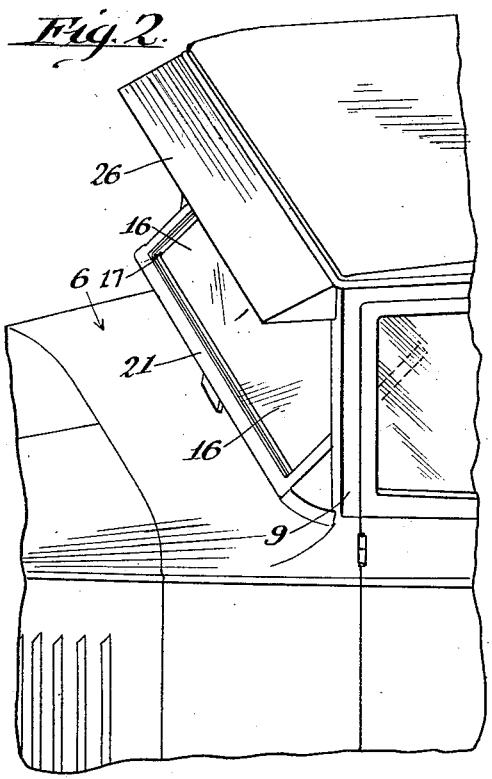
Fig. 2 is a perspective view of the windshield and a portion of the vehicle of Fig. 1.

In terms of broad inclusion, our invention is a "shadow-box" or glare-absorbing shield surrounding the windshield parallel to said axis of a vehicle. In order to direct light reflected from the rear of the vehicle to a point at which it will not impair the vision of the driver, the windshield is mounted to permit adjustment to any desired angle within limits, and means are included for establishing a weather-tight seal between the windshield and shadow-box, irrespective of the angle to which the windshield may be adjusted.

It is to be observed that a very bothersome feature connected with driving an automobile at night, is the light reflected from a vertical windshield into the eyes of the driver, from the headlights of a vehicle in the rear. This reflected light not only tends to bother the driver, but is also a real peril because of the fact that the driver's vision is impaired, often times to such an extent that he is unable to see the road or objects in the road ahead of him, as a result of the blinding effect of this reflected light. This difficulty of course, can be obviated by providing a windshield disposed at an angle from the vertical. However, it is not desirable to have the windshield disposed at such an angle at all times. Therefore, we have provided a windshield which is capable of adjustment, so that it may optionally be positioned substantially vertically, or swung to a position of angularity at the will of the operator.

A further step that we have taken in avoiding the blinding lights which ordinarily add to the hazard of night driving, is to provide a coating of light-absorbent material upon the under side of the visor of the vehicle, and upon the inside of the sealing means or "shadow boxes" within which the wind shield is pivotally mounted. As a result of the employment of this apparatus, the line of vision of any occupant of the vehicle, who is looking through the windshield, is through a darkened tunnel-like structure, the walls of which are of such a nature that reflection thereby is prevented, decreasing to a minimum, the illumination of the windshield itself. It is this illumination of the windshield, particularly when dust particles have collected thereupon, or the windshield has otherwise been soiled, that makes seeing therethrough so difficult; and accordingly, the device of our invention is one which is capable of decreasing quite materially, the hazards, and increasing the pleasures associated with driving at night.

In greater detail, the preferred embodiment of our invention is shown mounted upon the body 6 of an automobile of the conventional type. A pair of shadow boxes 7 and 8 are rigidly attached to the forward corner posts 9 of the body 6. Each shadow box comprises a pair of sector-shaped ends 11 connected by an arcuate shield 12. The shadow boxes 7 and 8 are arranged with one of the sector-shaped ends 11 of each box, rigidly attached to each of the forward corner posts 9, as clearly shown in the drawings. The shadow boxes are arranged with the apexes of the sector-shaped ends of each together, with the larger shadow box extending upwards and the small shadow box extending downwards.

A windshield 16 is mounted within the boxes 7 and 8, for rotary movement about an axis between the top and bottom edges of the windshield, this axis being coincident with a line joining all the apexes of the sector-shaped ends 11 of both boxes 7 and 8. The proportionate size and arrangement of the parts is such that each end 17 of the windshield 16, frictionally engages one of the ends 11 of each box 7 and 8; the upper edge 18 of the windshield 16 frictionally engages the arcuate shield 12 of the upper shadow box 7, and the lower edge 19 of the windshield 16 frictionally engages the arcuate shield 12 of the lower box 8. For this purpose, the ends 17 and edges 18 and 19 of the windshield, may be provided with suitable strips of rubber or other sealing means, in the well known manner.

Figure 3:
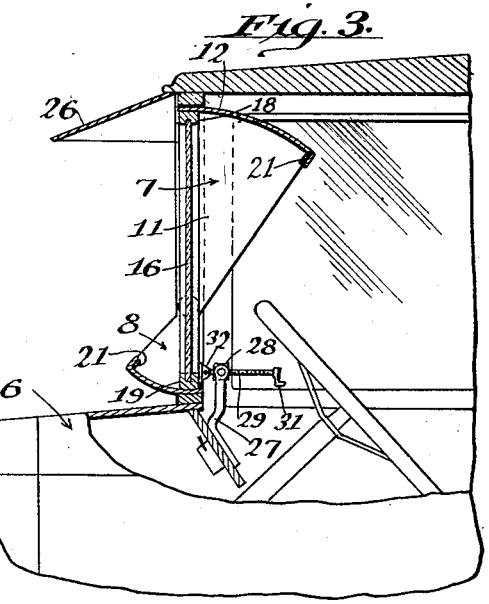
Fig. 3 is a side elevation partially in vertial section, of the vehicle and windshield, with the windshield adjusted to a different position from that shown in Fig. 1.
Figure 4:
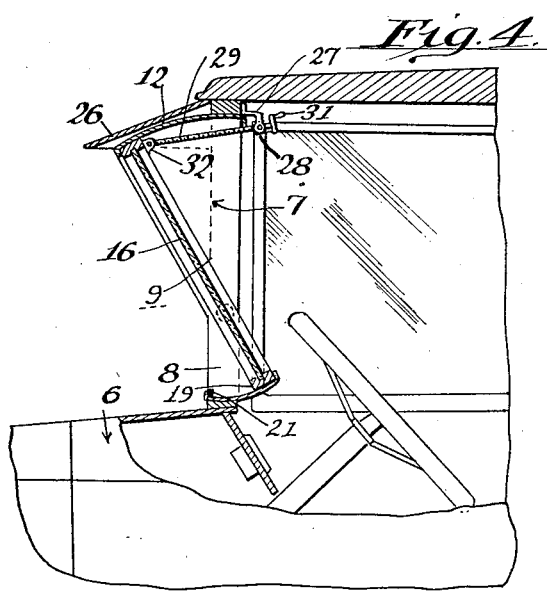
Fig. 4 is a view similar to Figs. 1 and 3, but showing a modification of the windshield.

In order to limit the turning movement of the windshield 16 so that the same may be at all times within the confines of the space formed by the shadow boxes 7 and 8 and the arcuate shields 12, we provide rubber-lined stops 21 at the inner and outer ends respectively, of the upper and lower shields 12, as clearly shown in Figs. 1, 3 and 4. In this manner all light from the sides of the vehicle is intercepted by the sector-shaped opaque side walls 7 and 8, irrespective of the position of the windshield 16.

We have provided improved means for obviating a large amount of reflected light which has heretofore proved very bothersome to the driver of an automobile at night. The under side of the visor 26 and the inside of the ends 11 and arcuate shields 12 of the shadow boxes, are provided with a coating of light-absorbent material such as a black paint which, when dried, presents a dull or matt surface.

In order to provide ready means for effecting adjustment of the windshield 16 to any desired position, we have provided a bracket 27 adapted to be rigidly secured to the windshield frame, or in any other convenient stationary position. In the present embodiment, it is shown positioned upon the instrument panel of the automobile. A nut 28 is mounted for pivotal movement in the upper end of the bracket 27; and a bolt 29 having an operating handle 31 is threaded through the nut 28. The other end of the bolt 29 is pivotally and revolubly retained within a bracket 32 secured to the windshield 16 at a point spaced from the axis of rotation thereof.

The manner of operating our improved windshield is believed to be obvious from the above description. By turning the bolt 29 by means of the handle 31 in the proper direction, the windshield 16 may be swung to the desired position. While driving during the day, the driver will probably desire that the windshield be positioned vertically as shown in Fig. 3, whereas while driving at night, reflection of light from vehicles to the rear, and other glare, may be eliminated by turning the bolt 29 to cause the windshield 16 to assume the position shown in Fig. 1. It is to be observed that the eyes of the driver are in horizontal alignment with that portion of the upper sector-shaped ends 11, which is about one-third of the distance from the apex thereof to the arcuate shield 12. This is important in that that portion of the sector-shaped ends past which the driver must direct his line of vision, is hardly, if any, wider than the corner posts 9. Therefore, the inclusion of the shadow boxes will present very little more structure in front of the driver to hamper his view of the road.

Various changes in the details of construction may be made without departing from the spirit and scope of the invention as defined by the appended claims.

We claim:

1. In combination with a vehicle body, a windshield frame rigid with said body, a shadow box rigid with said frame, comprising a sector-shaped end at each side of the frame and an arcuate shield joining the ends, and a windshield mounted within said frame for movement about an axis joining the apexes of said sector-shaped ends, an end of the windshield being in frictional engagement with each of said sector-shaped ends, and an edge of the windshield being in frictional engagement with said arcuate shield.

2. In combination with a vehicle body, a windshield frame rigid with said body, an opaque shadow box rigid with said frame, comprising a sector-shaped end at each side of the frame and an arcuate shield joining the ends, a windshield mounted within said frame for movement about an axis joining the apexes of said sector-shaped ends, an end of the windshield being in frictional engagement with each of said sector-shaped ends, an edge of the windshield being in frictional engagement with said arcuate shield, and means for optionally turning or holding the windshield against turning about its axis of rotary movement.

3. In combination with a vehicle body, a windshield frame rigid with said body, a pair of shadow boxes rigid with said frame, each comprising a sector-shaped end at each side of the frame, and an arcuate shield joining the two ends, the two shadow boxes extending in opposite directions, and a windshield mounted within said shadow boxes for rotary movement about an axis between the top and bottom edges of the windshield and joining all the apexes of the sector-shaped ends, each end of the windshield being in frictional engagement with one of the ends of each box, and each of the edges of the windshield being in frictional engagement with one of the arcuate shields.

4. In combination with a vehicle body, a windshield frame rigid with said body, a pair of shadow boxes rigid with said frame, each comprising a sector-shaped end at each side of the frame, and an arcuate shield joining the two ends, the two shadow boxes extending in opposite directions, a windshield mounted within said shadow boxes for rotary movement about an axis between the top and bottom edges of the windshield and joining all the apexes of the sector-shaped ends, each end of the windshield being in frictional engagement with one of the ends of each box, and each of the edges of the windshield being in frictional engagement with one of the arcuate shields, and means for optionally turning or holding the windshield against turning about its axis of rotary movement.

5. In combination with a vehicle body, a windshield frame rigid with said body, an opaque shadow box rigid with said frame, comprising a sector-shaped end at each side of the frame and an arcuate shield joining the ends, a windshield mounted within said frame for movement about an axis joining the apexes of said sector-shaped ends, an end of the windshield being in frictional engagement with each of said sector-shaped ends, an edge of the windshield being in frictional engagement with said arcuate shield, and a coating of light-absorbent material on the inside of said sector-shaped ends and arcuate shield.

6. In combination with a vehicle body, a shadow box comprising a pair of vertical opaque walls, a windshield mounted entirely between said walls, arcuate shields connecting the upper and lower ends of said walls, and means for turning said windshield on a horizontal axis.

7. In combination with a vehicle body, a shadow box comprising a pair of opaque walls, a windshield mounted entirely between said walls, arcuate shields connecting the upper and the lower ends of said walls, means for turning said windshield on a horizontal axis, and means limiting the turning movement of said windshield between the confines of the space formed between said walls and said arcuate shields.

8. In combination with a vehicle body, a windshield, a shadow box comprising a pair of opaque side walls on each side of the windshield, each of said side walls comprising two sectors extending in opposite directions and with their apexes joined, and means for turning said windshield about a horizontal axis joining all of said apexes.

9. In combination with a vehicle body, a windshield, a shadow box comprising a pair of opaque side walls on each side of the windshield, each of said side walls comprising two sectors extending in opposite directions with their apexes joined, arcuate shields connecting the upper and lower ends of said sectors, and means for turning said windshield about a horizontal axis joining all of said apexes.

10. In combination with a vehicle body, a windshield, a shadow box comprising a pair of opaque side walls on each side of the windshield, each side wall comprising a larger upper sector and a smaller lower sector extending in opposite directions, and means for turning said windshield about a horizontal axis joining all of said apexes.

11. In combination with a vehicle body, a windshield, a shadow box comprising a pair of opaque side walls on each side of the windshield, each side wall comprising a larger upper sector and a smaller lower sector extending in opposite directions and with their apexes joined, arcuate shields connecting the upper and lower ends of said sectors, and means for turning said windshield about a horizontal axis joining all of said apexes.

In testimony whereof we have signed our names to this specification.

WILLIAM C. MILLS.
ARCHIE C. FRIST.